US009273217B2

(12) United States Patent
Wery et al.

(10) Patent No.: US 9,273,217 B2
(45) Date of Patent: Mar. 1, 2016

(54) COMPOSITION THAT CAN BE SCREEN PRINTED ONTO POLYVINYL BUTYRAL

(71) Applicant: SAINT-GOBAIN GLASS FRANCE, Courbevoie (FR)

(72) Inventors: Sebastien Wery, Compiegne (FR); Elodie Ducourthial, Compiegne (FR); Angelique Debraine, Grandefresnoy (FR); Benoit Barbier, Jette (BE); Virginie Duclaux, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/230,098

(22) Filed: Mar. 31, 2014

(65) Prior Publication Data

US 2014/0212639 A1 Jul. 31, 2014

Related U.S. Application Data

(63) Continuation of application No. 14/111,340, filed as application No. PCT/FR2012/050785 on Apr. 11, 2012, now abandoned.

(30) Foreign Application Priority Data

Apr. 12, 2011 (FR) ...................... 11 53189

(51) Int. Cl.
*C09D 11/10* (2014.01)
*B32B 17/10* (2006.01)
*C09D 11/106* (2014.01)
(52) U.S. Cl.
CPC ........ *C09D 11/106* (2013.01); *B32B 17/10339* (2013.01); *Y10T 428/24802* (2015.01); *Y10T 428/24868* (2015.01)
(58) Field of Classification Search
CPC .................. C09D 11/00; Y10T 428/24802
See application file for complete search history.

(56) References Cited

U.S. PATENT DOCUMENTS 4,889,558 A * 12/1989 Mosser ...................... 106/14.12
2011/0052886 A1 3/2011 De Salins et al.

FOREIGN PATENT DOCUMENTS

FR 2 928 929 A1 9/2009

OTHER PUBLICATIONS

Machine Translation of Jp 2004-269572 obtained Apr. 1, 2015.*
International Search Report issued Jul. 25, 2012 in PCT/FR2012/050785 with English Translation.

* cited by examiner

*Primary Examiner* — Mark Ruthkosky
*Assistant Examiner* — Sathavaram I Reddy
(74) *Attorney, Agent, or Firm* — Oblon, McClelland, Maier & Neustadt, L.L.P.

(57) ABSTRACT

The invention relates to
a composition suitable for the black printing, via screen printing, of a sheet of polyvinyl butyral intended to be part of a laminated glazing unit, characterized in that it comprises:
11% to 13% by weight of polyvinyl butyral,
35% to 40% by weight of at least one aliphatic dicarboxylic acid diester, and
at least one black pigment in an amount and with a specific surface area that are selected so that the Brookfield viscosity of the composition at 20° C. is between 9 and 13 Pa·s;
a process for printing, via screenprinitng, a sheet of polyvinyl butyral intended to be part of a laminated glazing unit, using this composition;
a sheet of polyvinyl butyral intended to be part of a laminated glazing unit, and printed, via screen printing, using this composition; and
a laminated glazing unit comprising such a sheet of polyvinyl butyral.

18 Claims, No Drawings

COMPOSITION THAT CAN BE SCREEN PRINTED ONTO POLYVINYL BUTYRAL

CROSS REFERENCE TO RELATED APPLICATIONS

The present application is a continuation of U.S. patent application Ser. No. 14/111,340, filed on Oct. 11, 2013, which is a 35 U.S.C. §371 national stage patent application of International patent application PCT/FR2012/050785, filed on Apr. 11, 2012, published as WO 2012/140362 on Oct. 18, 2012, the text of which is incorporated by reference, and claims the benefit of the filing date of French application no. 1153189, filed on Apr. 12, 2011, the text of which is also incorporated by reference.

The invention relates to the field of laminated glazing units, commonly constituted of two sheets of glass bonded to one another by means of a plastic interlayer, such as a sheet of polyvinyl butyral.

Laminated glazing units, such as used as a motor vehicle windshield, or equivalent, have many uses: a layer that reflects solar radiation, making it possible to lower the temperature of the instrument panel and the ambient temperature in the passenger compartment, a support for the interior rearview mirror, electric current feed busbars especially for an ITO layer or a network of heating wires, an upper strip that filters solar radiation, of optionally graduated coloration, a rain detector, etc. Laminated glazing units are thus printed for various purposes: edge of the glazing unit opacified over its entire periphery in order to protect the underlying adhesive from UV radiation and hide body components or seals from the view of an observer outside of the vehicle, markings relating to the manufacturer, or to various standards, opacified surface in order to hide the base of the interior rearview mirror from the view of an observer outside of the vehicle.

The invention more particularly relates to the black printing of a laminated glazing unit in order to thereby opacify a portion of the surface.

It is customary to produce such printing on sheets of flat glass, that is to say, where appropriate, before bending operations (this is because it is much more difficult to print onto curved surfaces). One preferred process is the screen printing of enamel, it is able to provide the required optical qualities: good coverage, opacity and resolution, and can be easily industrialized.

Screen printing onto sheets of flat glass is not without drawbacks. In a laminate, the enamel is screenprinted on the inner face of the glass sheet intended for the external position, that is to say in contact with the atmosphere, referred to as face 2, and/or on the outer face of the glass sheet intended for the internal position, referred to as face 4, which is in contact with the internal atmosphere, in particular with the passenger compartment of a transport vehicle.

The drawbacks of enameling on face 2, inside in the structure of the assembled laminate, may be described in the following manner. The sheets of glass, during the bending thereof, in pairs, come into physical contact with one another despite the presence of interlayer powder, or with mechanical components of the bending equipment. This physical contact requires the prior use of an additional furnace for the annealing of the printed composition, in order to prevent the printed surfaces that are insufficiently hardened and dried from being adversely affected: bonding of the two glass sheets, despite the separation due to the interlayer powder, creation of defects at the surface of the non-hardened enamel, for example. This annealing is an additional step of the process which generates an additional cost in the production line.

In the enameling of face 4, outside in the structure of the assembled laminate, the curing of the enamel leads, in a known manner, to the creation of an optical defect.

Other drawbacks common to these enamellings of faces 2 and 4 exist.

Firstly, it is necessary to define a perfectly adapted and differentiated heating for the enameled zones on the one hand and the non-enameled zones on the other hand, since the enamel does not absorb the same amount of heat as the glass. The heating must thus be modified for each configuration of laminated glazing unit, of windshield, with and without rain detector, light detector, etc.

Furthermore, the optical density of the black enamel after curing is of the order of 3. However optical densities slightly greater than this value may be required, which can only be obtained by increasing the thickness of enamel deposited.

These problems could be solved by carrying out the screen printing on the interlayer adhesive sheets included in the composition of a laminated glazing unit, like polyvinyl butyral sheets, and no longer on the glass sheets.

Obviously, this modification of the process must not in any case adversely affect the specifications of the final product: compliance with standards and client specifications, not only from a mechanical strength or aging point of view, but also an esthetic point of view. Mention should in particular be made of:
- good coverage, which results in a small amount of pinholes that do not affect the transparency in an unacceptable manner,
- a required opacity corresponding to an optical density at least equal to 3, preferably to 4, as measured by an X-Rite 341 device or equivalent,
- a printing resolution and appearance that are acceptable for the client, i.e. similar to those of enameling on the glass.

The object of the invention is therefore the provision of a process for black screen printing onto an interlayer polyvinyl butyral sheet of a laminated glazing unit, having the combination of the afore-mentioned advantages, in particular that can be carried out in a single pass with "touch-dry" times that do not exceed 30 minutes, preferably 10 minutes and in particular 5 minutes. The drawbacks linked to the enameling on faces 2 and 4 described above, in particular the need for an additional step using an annealing furnace (face 2) and the creation of the optical defect on face 4, must be eliminated.

This object is achieved by the invention, one subject of which is a composition suitable for the black printing, via screen printing, of a sheet of polyvinyl butyral intended to be part of a laminated glazing unit, characterized in that it comprises:
- 11% to 13% by weight of polyvinyl butyral,
- 35% to 40% by weight of at least one aliphatic dicarboxylic acid diester, and
- at least one black pigment in an amount and with a specific surface area that are selected so that the Brookfield viscosity of the composition at 20° C. is between 9 and 13 Pa·s.

This composition has a rheology and an affinity (surface tension) with respect to the screen-printing screen and the polyvinyl butyral substrate that make it perfectly suitable for this process, in particular under working atmospheric conditions, such as 10° C. to 25° C. and 20% to 70% humidity, and which guarantee a printing result equivalent to printing onto flat glass. The ink thus developed makes it possible to obtain, with a single screen-printing pass, the high optical qualities, in particular the aforementioned absence of pinholes and sufficient optical density, at the same time as short touch-dry times that are compatible with an in-line process. Furthermore, the cohesive strength, or adhesion to one another of the constituents of a laminated glazing unit comprising an interlayer adhesive of polyvinyl butyral printed by screen printing with this composition enable it to satisfy the criteria in force in all countries. The adhesion of the laminate with the printed interlayer is validated by various mechanical tests, including a torsion test and the ball-drop test, via threshold values defined by manufacturer specifications and standards.

The laminated printed interlayer also satisfies the regulations in terms of aging/salt fog resistance, resistance to acids or else UV radiation thus guaranteeing the durability of the finished product irrespective of its usage conditions.

According to preferred features of the composition of the invention:
- the polyvinyl butyral that it contains has a molecular weight evaluated by gel permeation chromatography centered about a value at most equal to 90 000 and, in order of increasing preference, to 80 000, 70 000, 60 000 and 50 000 and at least equal to 20 000, preferably to 30 000 in polystyrene equivalents;
- the [OH] content of the polyvinyl butyral that it contains corresponds to a weight percentage of poly(vinyl alcohol) between 17% and 22%;
- said at least one aliphatic dicarboxylic acid diester is selected from a succinate, a glutarate or an adipate, in particular of di(C1 to C6 alkyl), preferably of dimethyl, diethyl, dipropyl or dibutyl, and particularly preferably of dimethyl, it being possible for several of these diesters to be contained in the mixture;
- said at least one black pigment consists of a mixture of carbon black and black iron oxide;
- it comprises an effective amount of plasticizer as wetting agent, such as 5% to 10% by weight of a benzoate ester, a phthalate and/or its derivative, an adipate and/or its derivative, a fatty acid ester, a trioctyl trimellitate, a triacetin, a glycerol, a propylene glycol, a sorbitol or a trimethylpentanediol diisobutyrate, alone or as a mixture of several thereof;
- it comprises an effective amount of a surface tension modifier that does not contain silicone, in particular 0.5% to 2% by weight of polyacrylate.

Moreover, other subjects of the invention are:
- a process for printing, via screen printing, a sheet of polyvinyl butyral intended to be part of a laminated glazing unit, in which a composition as described above is applied to the sheet, through a screen-printing screen, preferably with a thickness of the wet layer of between 10 and 50 μm; the chemical composition of the ink has been optimized in order to guarantee that with a small deposited thickness, the printing on the interlayer guarantees a good degassing and autoclaving quality, which constitute obligatory steps for obtaining a laminated glass;
- a sheet of polyvinyl butyral intended to be part of a laminated glazing unit, and printed, via screen printing, using a composition as described above; and
- a laminated glazing unit comprising such a sheet of polyvinyl butyral.

The invention is now illustrated by the following examples.

EXAMPLE 1

By screen printing an interlayer sheet of polyvinyl butyral with an ink of composition explained in detail in the table below, and after assembling two sheets of soda-lime float glass, a laminated glazing unit of high mechanical quality and having black printing of high optical quality as described above is obtained. The "touch-dry" time of 10 min is short and compatible with a continuous in-line industrial process.

In the table below, all the proportions are indicated as weight percentages.

| CONSTITUENT | CAS No. | % BY WEIGHT | MIN AND MAX % BY WEIGHT |
|---|---|---|---|
| POLYVINYL BUTYRAL | 63148-65-2 | 12 | 11/13 |
| WETTING AGENT | 27987-25-3 | 8 | 5/10 |
| CARBON BLACK | 133386-4 | 9 | 8/12 |
| BLACK IRON OXIDE | 1317-61-9 | 28 | 28/32 |
| DIESTER | 627-93-0 | 38 | 35/40 |
|  | 1119-40-0 |  |  |
|  | 106-65-0 |  |  |
| CYCLOHEXANONE | 108-94-1 | 4 | 3/5 |
| SURFACE TENSION MODIFIER | 26376-86-3 | 1 | 0.5/2 |

The molecular weight of the polyvinyl butyral is evaluated in the following manner. Solutions of polyvinyl butyral powders at 3 g/l in tetrahydrofuran are prepared, then are injected into a gel permeation chromatography column of Waters Styragel HR4E type, 1 ml/min of tetrahydrofuran. The chromatograms are established using an evaporative light scattering detector. The broad peak observed at 7-7.1 min indicates weights, in PS equivalents, of 46 000-55 000, that it to say practically centered about 50 000.

The [OH] content of the polyvinyl butyral corresponds to a weight percentage of poly(vinyl alcohol) of 18%.

The wetting agent also acts as a plasticizer, that is to say that it allows a greater deformation of the printed ink film without degradation of its optical properties. Here it is dimethylcyclohexyl phthalate.

The specific surface area of the carbon black is 65 $m^2/g$, values of 40 to 150 $m^2/g$ being suitable in general.

The diester is a mixture of 60% by weight of dimethyl glutarate, 20% by weight of dimethyl succinate and 20% by weight of dimethyl adipate.

The surface tension modifier is a polyacrylate; it does not contain silicone.

The Brookfield viscosity of the ink at 20° C. is 11 Pa·s, values between 9 and 13 Pa·s being suitable within the context of the invention. This measurement is carried out in the following manner. The viscosity of the ink is reduced to a stable value by rotation for at least 8 hours of a roller in the ink. A sample of the latter is withdrawn, on which the viscosity is measured using a cone-plate viscometer.

COUNTER-EXAMPLE 1

The same constituents as in example 1 are mixed, by modifying only the weight proportions of the wetting agent to 6%, of the black iron oxide to 30%, of the diester to 20% and of the cyclohexanone to 22%.

With this composition that contains a relatively low proportion of diester, by replacing almost half of the latter with cyclohexanone, the viscosities obtained and the speed of drying do not allow mass production industrial printing. An appearance of pinholes in much too great a number in the printing and during the passage in the autoclave is observed, and a drying in the screen-printing screen is observed.

The invention claimed is:
1. A composition suitable for the black printing, via screen printing, of a sheet of polyvinyl butyral, wherein the composition comprises:
   from 3% to 5% by weight of cyclohexanone;
   from 11% to 13% by weight of polyvinyl butyral;

from 35% to 40% by weight of at least one aliphatic dicarboxylic acid diester;
an effective amount of a surface tension modifier that does not contain silicone; and
at least one black pigment in an amount and with a specific surface area such that the Brookfield viscosity of the composition at 20° C. is between 9 and 13 Pa·s,
wherein the surface tension modifier is a polyacrylate.

2. The composition of claim 1, wherein the polyvinyl butyral contained in the composition has a molecular weight evaluated by gel permeation chromatography centered about a value at most equal to 90 000 in polystyrene equivalents.

3. The composition of claim 1, wherein the polyvinyl butyral contained in the composition has a molecular weight evaluated by gel permeation chromatography centered about a value at least equal to 20 000 in polystyrene equivalents.

4. The composition of claim 1, wherein the [OH] content of the polyvinyl butyral contained in the composition corresponds to a weight percentage of poly(vinyl alcohol) between 17% and 22%.

5. The composition of claim 1, wherein said at least one aliphatic dicarboxylic acid diester is a succinate, a glutarate, or an adipate.

6. The composition of claim 1, wherein said at least one black pigment is a mixture of carbon black and black iron oxide.

7. The composition of claim 1, further comprising:
an effective amount of plasticizer as wetting agent.

8. The composition of claim 1, wherein said at least one black pigment is a mixture of carbon black and black iron oxide, and the composition comprises:
from 8% to 12% by weight of carbon black; and
from 28% to 32% by weight of black iron oxide.

9. The composition of claim 8, wherein the aliphatic dicarboxylic acid diester is a mixture of a succinate, a glutarate, and an adipate.

10. A process for printing, via screen printing, a sheet of polyvinyl butyral, the process comprising:
applying the composition of claim 1 to the sheet of polyvinyl butyral, through a screen-printing screen.

11. The process of claim 10, wherein a thickness of a wet layer of composition applied to the polyvinyl butyral sheet is between 10 and 50 μm.

12. A composition suitable for the black printing, via screen printing, of a sheet of polyvinyl butyral, wherein the composition comprises:
from 5% to 10% by weight of at least one plasticizer selected from group consisting of a benzoate ester, a phthalate, an adipate, a fatty acid ester, a trioctyl trimellitate, a triacetin, a glycerol, a propylene glycol, a sorbitol, and a trimethylpentanediol diisobutyrate;
from 11% to 13% by weight of polyvinyl butyral;
from 35% to 40% by weight of at least one aliphatic dicarboxylic acid diester;
an effective amount of a surface tension modifier that does not contain silicone; and
at least one black pigment in an amount and with a specific surface area such that the Brookfield viscosity of the composition at 20° C. is between 9 and 13 Pa·s,
wherein the surface tension modifier is a polyacrylate.

13. The composition of claim 12, wherein the plasticizer is dimethylcyclohexyl phthalate.

14. The composition of claim 12, wherein the polyvinyl butyral contained in the composition has a molecular weight evaluated by gel permeation chromatography centered about a value of a least equal to 20 000 and at most equal to 90 000 in polystyrene equivalents.

15. The composition of claim 12, wherein the [OH] content of the polyvinyl butyral contained in the composition corresponds to a weight percentage of poly(vinyl alcohol) between 17% and 22%.

16. The composition of claim 12, wherein said at least one aliphatic dicarboxylic acid diester is a succinate, a glutarate, or an adipate.

17. The composition of claim 12, wherein said at least one black pigment is a mixture of carbon black and black iron oxide.

18. A composition suitable for the black printing, via screen printing, of a sheet of polyvinyl butyral, wherein the composition consists of:
from 11% to 13% by weight of polyvinyl butyral;
from 5% to 10% by weight of a wetting agent;
from 8% to 12% by weight of carbon black;
from 28% to 32% by weight of black iron oxide;
from 35% to 40% by weight of at least one aliphatic dicarboxylic acid diester;
from 3% to 5% by weight of cyclohexanone;
from 0.5% to 2% by weight of a surface tension modifier that does not contain silicone, wherein the surface tension modifier is a polyacrylate; and
wherein the composition has a Brookfield viscosity at 20° C. between 9 and 13 Pa·s.

* * * * *